(12) United States Patent
Viswanathan

(10) Patent No.: US 11,390,540 B2
(45) Date of Patent: Jul. 19, 2022

(54) WATER PURIFICATION COMPOSITIONS AND THE METHOD OF PRODUCING THE SAME

(71) Applicant: BOARD OF TRUSTEES OF THE UNIVERSITY OF ARKANSAS, Little Rock, AR (US)

(72) Inventor: Tito Viswanathan, Little Rock, AR (US)

(73) Assignee: BOARD OF TRUSTEES OF THE UNIVERSITY OF ARKANSAS, Little Rock, AR (US)

(*) Notice: Subject to any disclaimer, the term of this patent is extended or adjusted under 35 U.S.C. 154(b) by 161 days.

(21) Appl. No.: 16/940,496

(22) Filed: Jul. 28, 2020

(65) Prior Publication Data

US 2020/0354237 A1  Nov. 12, 2020

Related U.S. Application Data

(62) Division of application No. 16/021,462, filed on Jun. 28, 2018, now Pat. No. 10,759,681.

(51) Int. Cl.
*B01J 20/02* (2006.01)
*B01J 41/09* (2017.01)
*C02F 1/28* (2006.01)
*C02F 1/42* (2006.01)
*C02F 101/10* (2006.01)
(Continued)

(52) U.S. Cl.
CPC ............ *C02F 1/42* (2013.01); *B01J 20/0203* (2013.01); *B01J 41/09* (2017.01); *C02F 1/281* (2013.01); *C02F 1/288* (2013.01); *C02F 2001/422* (2013.01); *C02F 2101/103* (2013.01); *C02F 2101/105* (2013.01); *C02F 2101/106* (2013.01); *C02F 2101/14* (2013.01); *C02F 2101/20* (2013.01); *C02F 2103/001* (2013.01); *C02F 2103/10* (2013.01); *C02F 2305/08* (2013.01)

(58) Field of Classification Search
CPC .................. C02F 1/42; C02F 2101/103; C02F 2101/105; C02F 2101/106; C02F 2101/14; C02F 2101/20; C02F 2103/001; C02F 2103/10; B01J 41/09
See application file for complete search history.

(56) References Cited

U.S. PATENT DOCUMENTS

2007/0181502 A1* 8/2007 Johnson ............... B01J 20/3242
530/414

FOREIGN PATENT DOCUMENTS

CN   106750470 A * 5/2017   ............ B01J 20/264

OTHER PUBLICATIONS

Machine Translation of CN 106750470.*

* cited by examiner

*Primary Examiner* — Benjamin L Lebron
(74) *Attorney, Agent, or Firm* — Locke Lord LLP; Tim Tingkang Xia, Esq.

(57) ABSTRACT

The present disclosure relates to water purification compositions and the method of producing the same. Specifically, the present disclosure relates to a method of producing a water purification composition including providing a substrate having one or more functional groups that has hydroxyl, thiol, carboxyl, and/or amino group; depositing a solution of a metal salt on the substrate; depositing a solution of carboxylic acid compound on the substrate; forming a mixture wherein the metal cross-links the hydroxyl, thiol, carboxyl and/or amino groups on the surface of the sub- (Continued)

strate, and the carboxylic acid compound; and heating the mixture till the product is dry.

15 Claims, 11 Drawing Sheets

(51) Int. Cl.
*C02F 101/20* (2006.01)
*C02F 101/14* (2006.01)
*C02F 103/00* (2006.01)
*C02F 103/10* (2006.01)

WATER PURIFICATION COMPOSITIONS AND THE METHOD OF PRODUCING THE SAME

CROSS-REFERENCE TO RELATED APPLICATIONS

This application is a divisional application of and claims the benefit of U.S. patent application Ser. No. 16/021,462, filed Jun. 28, 2018, now allowed, which is incorporated herein by reference in its entirety.

STATEMENT OF FEDERALLY SPONSORED RESEARCH

This invention was made with Government support under Contract Nos. EPD12027 and EPD13044 awarded by the U.S. Environmental Protection Agency (EPA). The Government has certain rights in the invention.

FIELD OF THE INVENTION

The present disclosure relates to water purification compositions and the method of producing the same. Specifically, the present disclosure relates to compositions containing a substrate that has hydroxyl, thiol, carboxyl or amino groups, a metal oxide, and a carboxylic acid compound. The composition is useful for the removal of soluble phosphorus, selenium, fluoride and heavy metal contaminants that may be present in water. The composition could be used in numerous fields, including but not limited to, oil and gas, mining, storm water, agricultural runoffs, municipal wastewater, industrial wastewater, extraction of precious metals from electronic components and removal of toxic gases, such as hydrogen sulfide, from well waters.

BACKGROUND OF THE INVENTION

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

U.S. Pat. No. 7,291,578 discloses a hybrid anion exchanger for selective removal of contaminating ligands from fluids and method of manufacture thereof. Polymeric anion exchangers are used as host materials in which hydrated Fe(III) Oxides (HFO) are irreversibly dispersed within the exchanger beads. Since the anion exchangers have positively charged quaternary ammonium functional groups, anionic ligands such as arsenates, chromates, oxalates, phosphates, phthalates can permeate in and out of the gel phase. Consequently, anion exchanger-supported HFO micro particles exhibit significantly greater capacity to remove arsenic and other ligands in comparison with cation exchanger supports. Loading of HFO particles is carried out by preliminary loading of the anion exchange resin with an oxidizing anion such as (manganate) $MnO_4^-$ or hypochlorite ($OCl^-$), followed by passage of a Ferrous Sulfate solution through the resin.

U.S. Pat. No. 9,901,918 discloses a hybrid ion exchange material and method for making the same. A high capacity hybrid ion exchange material with enhanced ability to selectively remove molecular (organics) and anionic (fluoride ion and oxyanions of phosphorus and arsenic) species from drinking water, industrial streams, and wastes, for applications predominantly in the medical and food industries. A hybrid ion exchange material comprising: an activated carbon carrier; precipitated mixed oxide including alumina; doping polyvalent metal oxide including titanium, zirconium, tin, cerium, lanthanum, iron, or manganese, or any combination thereof; and, wherein said mixed oxide or said doping polyvalent metal oxide or both are configured to selectively adsorb organic molecules, fluoride ion, or oxyanions of phosphorus and arsenic.

U.S. Pat. No. 9,120,093 discloses a hybrid anion exchanger impregnated with hydrated zirconium oxide for selective removal of contaminating ligand and methods of manufacture and use thereof. Polymeric anion exchanger are used as host materials in which submicron sized hydrated Zr(IV) oxides (HZrO) particles are irreversibly dispersed within the ion exchange medium, such as beads or fibers. The hydrated Zirconium oxide can be impregnated into the pore structure of resin by mixing the parent anion exchange resin with zirconium solution prepared by pre-calcined zirconium oxide dissolved in concentrated mixture of alcohol and acid, and then followed by precipitation of HZrO particles within the resin by using alkaline solution. Since the anion exchangers have positively charged such as quaternary ammonium functional groups, anionic ligands such as arsenate, fluoride can transport in and out of the gel phase. Consequently, anion exchanger-supported HZrO submicron particles exhibit significantly greater capacity to remove arsenic and fluoride in comparison with parent anion exchange.

U.S. Pat. No. 9,663,389 discloses the use of MgO doped with a divalent or trivalent metal cation for removing arsenic from water. Systems and methods for use of magnesium hydroxide, either directly or through one or more precursors, doped with a divalent or trivalent metal cation, for removing arsenic from drinking water, including water distribution systems. In one embodiment, magnesium hydroxide, $Mg(OH)_2$ (a strong adsorbent for arsenic) doped with a divalent or trivalent metal cation is used to adsorb arsenic. The complex consisting of arsenic adsorbed on $Mg(OH)_2$ doped with a divalent or trivalent metal cation is subsequently removed from the water by conventional means, including filtration, settling, skimming, vortexing, centrifugation, magnetic separation, or other well-known separation systems. In another embodiment, magnesium oxide, MgO, is employed, which reacts with water to form $Mg(OH)_2$. The resulting $Mg(OH)_2$ doped with a divalent or trivalent metal cation, then adsorbs arsenic, as set forth above. The method can also be used to treat human or animal poisoning with arsenic.

U.S. Pat. No. 7,341,667 discloses a process for reduction of inorganic contaminants from waste streams: The invention relates to the use of used alumina to reduce the level of inorganic contaminants, such as mercury and arsenic, from waste fluid streams. The invention further provides a process for reducing the level of mercury or arsenic in fluid streams by contacting the fluid stream with used alumina, such as used Claus catalyst. However, there is still need for a water purification composition that removes phosphorus and other contaminants from contaminated waters.

U.S. Pat. No. 9,095,837 discloses a method for the production and use of a metal oxide-containing resin present in a quaternary amine ("quat") modified substrate, such as wood and other hydroxyl and amino groups present on the surface of the substrate. The method requires treating a substrate material having a functional group with a quaternary amine compound to form a function site. Specifically, the method requires the modification of the substrate using an epoxy form of 3-chloro-2-hydroxypropyltrimethylammonium chloride prior to deposition of metal oxide on the quat-modified substrate. The modification requires use of the toxic epoxy component or generation of the epoxy reactant through use of a strong base (such as sodium hydroxide) on 3-chloro-2-hydroxypropyltrimethylammonium chloride. This could be dangerous for the technicians working around this material who could be subject to sensitization upon inhalation or contact with the material. The strong caustic material used can also cause chemical burns and attack the eyes upon contact. The odor and toxicity associated with volatilization of the quat is also of concern to workers involved in the production of the media.

Therefore, there is still need for a water purification composition that removes phosphorus and other contaminants from contaminated waters, which is cheap, effective, versatile, benign, reusable and capable of being made from a renewable resource that can compete and replace existing commercial composition in the water purification arena. The composition should exhibit fast kinetics (removal rate) and have a high capacity in terms of the amount of phosphorus removed per given mass of the active and expensive ingredient in the composition. No composition currently exists that satisfies all the above properties. Several commercial composition exist that exhibit one or more of the desirable properties named above, but the search for an extremely versatile composition that supersedes the existing varieties of products has alluded researchers so far.

SUMMARY OF THE INVENTION

The present disclosure relates to water purification compositions and the method of producing the same. Specifically, the present disclosure relates to compositions containing a substrate that has hydroxyl, carboxyl, thiol, or amino groups, a metal oxide, and a carboxylic acid compound. The composition is useful for the removal of soluble phosphorus, selenium, fluoride and heavy metal contaminants that may be present in water. The composition could be used in numerous fields, including but not limited to, oil and gas, mining, storm water, agricultural runoffs, municipal wastewater, industrial wastewater, extraction of precious metals from electronic components and removal of toxic gases, such as hydrogen sulfide, from well waters.

Certain aspects of the present disclosure are directed to a water purification composition containing a substrate with a surface containing hydroxyl, thiol, carboxyl and/or amino groups, a carboxylic acid compound, and a metal, wherein the metal cross-links the hydroxyl, thiol, carboxyl and/or amino groups on the surface of the substrate, and the carboxylic acid compound.

In one aspect, the present disclosure is directed to a water purification composition containing a substrate with a surface containing hydroxyl, thiol, carboxyl and/or amino groups, a carboxylic acid compound containing a positively charged group, and a metal, wherein the metal cross-links the hydroxyl, thiol, carboxyl and/or amino groups on the surface of the substrate, and the carboxylic acid compound.

In one aspect, the present disclosure is directed to a water purification composition containing a substrate with a surface containing hydroxyl groups, a carboxylic acid compound, and a metal, wherein the metal cross-links the carboxylic acid compound and the hydroxyl groups on the surface of the substrate to form metal oxide.

In certain embodiments, the substrate of the present disclosure can be selected from, for example, wood, cellulose, alginate, carboxymethylcellulose, hydroxypropyl cellulose, chitin, lignin, tannin, silk, wool, chitosan, peanut hulls, wood pulp, grass, bamboo, polyvinyl alcohol, soybean waste, okara, cork, phenol-formaldehyde resins, corn cob, old newspaper, coconut husk, graphene oxide, activated carbon, amino resin, open celled foams containing hydroxyl, amino or carboxyl groups on its surface, coffee grounds, protein, and combinations thereof.

In certain embodiments, the metal of the present disclosure can be selected from, for example, Al, Ti, Mn, Fe, Co, Ni, Cu, Zn, Zr, Mo, Sn, Bi, La, Ce, Y, and combination thereof. In some specific embodiments, the metal is Zr and/or Al; and in one particular embodiment, the metal is Zr. In another embodiment, the metal is Fe, and transformed into hydrated iron oxides of $Fe_3O_4$, FeO, and $Fe_2O_3$ in the composition.

In certain embodiments, the carboxylic acid compound of the present disclosure can be selected from, for example, betaine or a betaine derivatives, aromatic carboxylic acids, arginine, lysine, histidine, and combination thereof. In some specific embodiments, the carboxylic acid compound is betaine or betaine derivatives.

In one embodiment, the present disclosure is directed to a water purification composition containing a substrate with a surface containing hydroxyl groups, a betaine or a betaine derivative compound, and Zr, wherein the Zr cross-links the hydroxyl groups on the surface of the substrate to form Zr oxide, and the betaine or betaine derivative reacts with Zr to form stable derivatives.

In one aspect, the water purification composition of the present disclosure is directed to nanocomposite materials. In another aspect, the water purification composition of the present disclosure is directed to magnetic materials.

Certain aspects of the present disclosure are directed to the method of making the water purification compositions (as disclosed herein) containing a substrate with a surface containing hydroxyl, thiol, carboxyl and/or amino groups, a carboxylic acid compound, and a metal, wherein the metal cross-links the hydroxyl, thiol, carboxyl and/or amino groups on the surface of the substrate, and the carboxylic acid compound.

In one aspect, the method of making the water purification compositions of the present disclosure includes:
providing a substrate having one or more functional groups that has hydroxyl, thiol, carboxyl, and/or amino group;
depositing a solution of a metal salt on the substrate;
depositing a solution of carboxylic acid compound on the substrate;
forming a mixture wherein the metal cross-links the hydroxyl, thiol, carboxyl and/or amino groups on the surface of the substrate, and the carboxylic acid compound; and
heating the mixture till the product is dry.

In another aspect, the method of making the water purification compositions of the present disclosure further includes:
treating the mixture with an alkali so that the carboxylic acid compound becomes covalently attached to the metal.

In another aspect, the method of making the water purification compositions of the present disclosure further includes:
heating the mixture so that the metal cross-links the hydroxyl, thiol, carboxyl and/or amino groups on the surface of the substrate.

In certain embodiments, the metal salt in the method of making the water purification compositions of the present disclosure contains an anion selected from a group of $Cl^-$, $NO_3^-$, $CH_3CO_2^-$, $SO_4^{2-}$, and combination thereof. In some specific embodiments, the metal salt in the method of making the water purification compositions of the present disclosure is ammonium zirconium carbonate, ammonium zinc carbonate (diammonium zinc biscarbonate), $Zr_2OCl_2 \cdot 8H_2O$, $ZrO(NO_3)_2$, or freshly prepared aqueous soluble $Zr(OH)_2$.

In another aspect, the method of making the water purification compositions of the present disclosure includes:
 providing a starting substrate having one or more functional groups capable of reacting with ammonium zirconium carbonate, ammonium zinc carbonate, or an activated zirconium species generated by thermal decomposition;
 depositing a carboxylic acid compound solution on the surface of the substrate;
 treating the carboxylic acid compound deposited on the surface of the substrate with a solution of ammonium zirconium carbonate, ammonium zinc carbonate, or an activated zirconium species to form a mixture; and
 heating the mixture till the product is ammonia and carbon dioxide free.

In certain embodiments, the method of making the water purification compositions of the present disclosure includes heating the composite to a temperature, including but not limited to, up to 80° C., between 50° C. and 80° C., between 70 and 80° C. for a period of time effective to form a composite that is free of ammonia and carbon dioxide.

In one aspect, the present disclosure relates to a method of purifying water contaminated with phosphate, fluoride, selenate, selenite, arsenate, arsenite and other heavy metal ions, which comprises of contacting the contaminated water with the water purification compositions disclosed herein.

Further aspects, features, and advantages of the present disclosure will be apparent to those of ordinary skill in the art upon examining and reading the following Detailed Description of the Preferred Embodiments.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating an embodiment of the invention and are not to be construed as limiting the invention. Further objects, features and advantages of the invention will become apparent from the following detailed description taken in conjunction with the accompanying figures showing illustrative embodiments of the invention, in which.

DETAILED DESCRIPTION OF THE INVENTION

Figure 1:
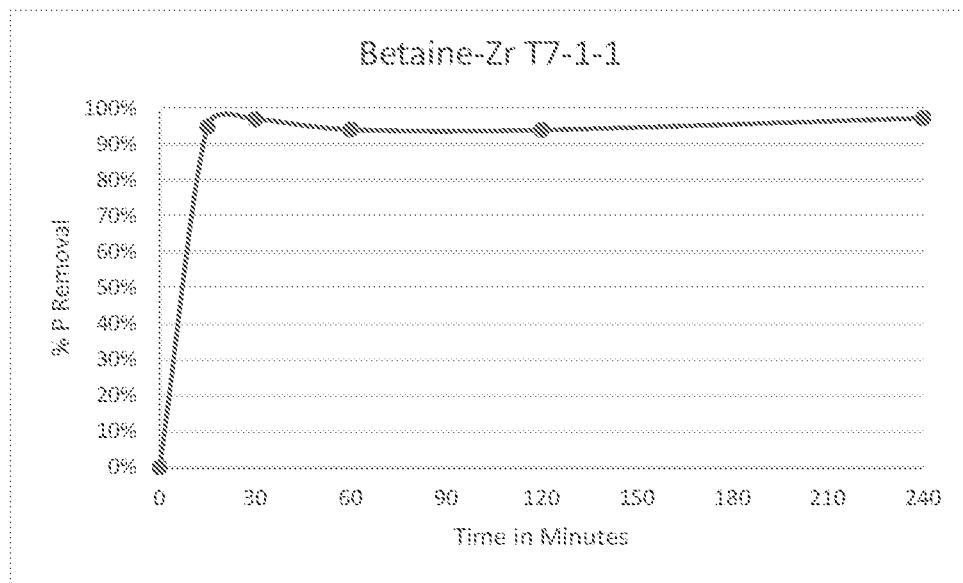
FIG. 1 illustrates the phosphorus removal experiment that was performed with 300 mg of the composition from Experiment No. 1 mechanically stirred in 100 mL of 10 mg P/L with aliquots taken at 15 min., 30 min., 1 hr., 2 hr., and 4 hr.

The following is a detailed description provided to aid those skilled in the art in practicing the present disclosure. Those of ordinary skill in the art may make modifications and variations in the embodiments described herein without departing from the spirit or scope of the present disclosure. All publications, patent applications, patents, figures and other references mentioned herein are expressly incorporated by reference in their entirety.

The present description relates to water purification compositions and the method of producing the same. Specifically, the present disclosure relates to compositions containing a substrate that has hydroxyl, thiol, carboxyl or amino groups, a metal oxide, and a carboxylic acid compound.

Unless otherwise defined, all technical and scientific terms used herein have the same meaning as commonly understood by one of ordinary skill in the art to which this disclosure belongs. The terminology used in the description is for describing particular embodiments only and is not intended to be limiting of the disclosure.

Where a range of values is provided, it is understood that each intervening value, to the tenth of the unit of the lower limit unless the context clearly dictates otherwise (such as in the case of a group containing a number of carbon atoms in which case each carbon atom number falling within the range is provided), between the upper and lower limit of that range and any other stated or intervening value in that stated range is encompassed within the disclosure. The upper and lower limits of these smaller ranges may independently be included in the smaller ranges is also encompassed within the disclosure, subject to any specifically excluded limit in the stated range. Where the stated range includes one or both of the limits, ranges excluding either both of those included limits are also included in the disclosure.

The following terms are used to describe the present disclosure. Unless otherwise defined, all technical and scientific terms used herein have the same meaning as commonly understood by one of ordinary skill in the art to which this disclosure belongs. The terminology used in the description is for describing particular embodiments only and is not intended to be limiting of the disclosure.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combination of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "nanocomposite" or prefix "nano-", and the like refers to elements or articles having widths or diameters of less than about 1 µm, preferably less than about 100 nm in some cases. Specified widths can be smallest width (i.e. a width as specified where, at that location, the article can have a larger width in a different dimension), or largest width (i.e. where, at that location, the article's width is no wider than as specified, but can have a length that is greater), unless pointed out otherwise.

This invention relates to both the composition of the product as well as the method of its preparation. Certain aspects of the present disclosure are directed to a water purification composition containing a substrate with a surface containing hydroxyl, thiol, carboxyl and/or amino groups, a carboxylic acid compound, and a metal, wherein the metal cross-links the hydroxyl, thiol, carboxyl and/or amino groups on the surface of the substrate, and the carboxylic acid compound.

In one aspect, the present disclosure is directed to a water purification composition containing a substrate with a surface containing hydroxyl, thiol, carboxyl and/or amino groups, a carboxylic acid compound containing a positively charged group, and a metal, wherein the metal cross-links the hydroxyl, thiol, carboxyl and/or amino groups on the surface of the substrate, and the carboxylic acid compound.

In one aspect, the present disclosure is directed to a water purification composition containing a substrate with a surface containing hydroxyl groups, a carboxylic acid compound, and a metal, wherein the metal cross-links the carboxylic acid compound and the hydroxyl groups on the surface of the substrate to form metal oxide.

In certain embodiments, the substrate of the present disclosure can be selected from, for example, wood, cellulose, alginate, carboxymethylcellulose, hydroxypropyl cellulose, chitin, lignin, tannin, silk, wool, chitosan, peanut hulls, wood pulp, grass, bamboo, polyvinyl alcohol, soybean waste, okara, cork, phenol-formaldehyde resins, corn cob, old newspaper, coconut husk, graphene oxide, activated carbon, amino resin, open celled foams with hydroxyl, amino or carboxy groups on its surface, coffee grounds, protein, and combination thereof.

In certain embodiments, the metal of the present disclosure can be selected from, for example, Al, Ti, Mn, Fe, Co, Ni, Cu, Zn, Zr, Mo, Sn, Bi, La, Ce, Y, and combination thereof. In some specific embodiments, the metal is Zr, Zn, and/or Al; and in one particular embodiment, the metal is Zr. In another embodiment, the metal is Fe, and transformed into hydrated iron oxides of $Fe_3O_4$, FeO, and $Fe_2O_3$ in the composition.

In certain embodiments, the carboxylic acid compound of the present disclosure can be selected from, for example, betaine or a betaine derivatives, aromatic carboxylic acids, arginine, lysine, histidine, and combination thereof. In some specific embodiments, the carboxylic acid compound is betaine or betaine derivatives.

In one embodiment, the present disclosure is directed to a water purification composition containing a substrate with a surface containing hydroxyl groups, a betaine or a betaine derivative compound, and Zr, wherein the Zr cross-links the hydroxyl groups on the surface of the substrate to form Zr oxide, and the betaine or betaine derivative reacts with Zr to form stable derivatives.

In one aspect, the water purification composition of the present disclosure is directed to nanocomposite materials. In another aspect, the water purification composition of the present disclosure is directed to magnetic materials.

In one exemplary embodiment, the preparation starts with a substrate containing hydroxyl groups on the surface of the material. (Other groups that may be present on the surface may include thiol, amino, or carboxyl/carboxylate). The surface of the material is treated with an aqueous solution of certain transition metal salts. Following the absorption of the metals in the surface of the substrate, an aqueous solution of glycine betaine (N, N, N-trimethylglycine) hydrochloride is sprayed and mixed with the substrate. After a brief period, aqueous ammonia is sprayed on the composition product (above) and kept covered for a few minutes. The addition of base may catalyze several reactions including the cross-linking of hydroxyl groups to the transition metal ions, as well as the reaction of the carboxylate group of the betaine to the transition metal ion. The addition of base followed by a mild heating process results in transition metal cations that react with hydroxyls as well as carboxyl groups. Following the termination of the reaction the composition is washed with water to yield a pure product which may be dried and stored until further use.

The metals and transition metals that may be used in the invention include salts of the following metals. The metal ions $Al^{3+}$, $Ti^{3+}$, $Ti^{4+}$, Mn (different oxidation states) and metals with different oxidation states include those from Fe, Co, Ni, Cu, Zn, Zr, Mo, Sn, Bi, La, Ce, and Y. The salts may include oxychlorides, oxy-nitrates and other related salts as well. Of these salts Zr, Ti, Zn and Al are highly desirable due to their capacity to cross-link hydroxyl groups on the surface and form stable salts with carboxylic acids. It is theorized that the carboxylic acid group reacts with metal cations to give stable derivatives. One of the preferred Zr salt is Ammonium Zirconium Carbonate (AZC) which has the following structure:

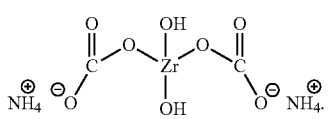

This is sold as an aqueous solution, Bacote™ 20 by MEL Chemicals among other world manufacturers.

Another is Zirmel 1000 which has a general formula

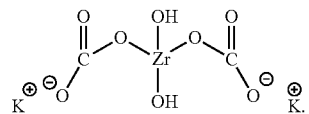

AZC and Zirmel are water-soluble benign salts yielding a clear aqueous solution and are commonly used as cross-linking agents in the paper industry and in sizing applications.

Another commercial product which may be used is zinc ammonium carbonate (ZAM), which is a water-soluble salt and has about 15% ZnO (Charkit Chemical) with the following structure

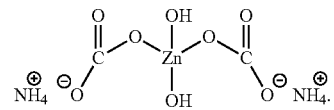

It is a clear solution with pH 9.5-11.0. It is generally used for cross-linking carboxy-containing polymers.

The betaine of choice is betaine hydrochloride (glycine betaine hydrochloride) with the following structural formula:

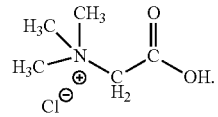

Glycine betaine is a beet sugar extract. It may also be synthesized from glycine. Betaine is used to reduce homocysteine levels in people with a genetic condition called homocysteinemia, in which amino acid builds up in the body. Betaine hydrochloride has also been used to increase the level of HCl in the stomach, necessary for proper digestion and assimilation of nutrients. Other betaines that may be used include compounds with the general formula:

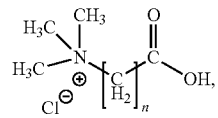

where n is a whole number from 1 to 8. Another betaine of interest is cocamidopropyl betaine (CAPB) (which generally consists of a mixture of closely related organic compounds derived from coconut oil and dimethylaminopropylamine. CAPB is a pale yellow viscous liquid used as a surfactant in personal care products. Lauramido propyl betaine (shown below) is a major component in CAPB:

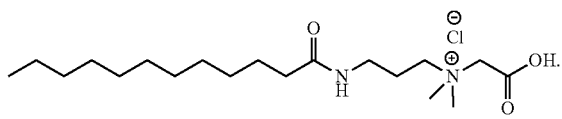 [SMILES: CCCCCCCCCCCC(=O)NCCC[N+](C)(C)CC(=O)O ; [Cl-]]

Betaine in the current process being described probably serves not only as a reactant but also as a surfactant to help bring the reactants together.

When a composition of hydroxyl-containing substrate (for example cellulose), a zirconium salt (e.g. AZC) and betaine hydrochloride is brought together and heated (warmed) to above 40° C. but less than 80° C., a reaction is theorized which links the cellulose to the betaine as shown in the schemes below.

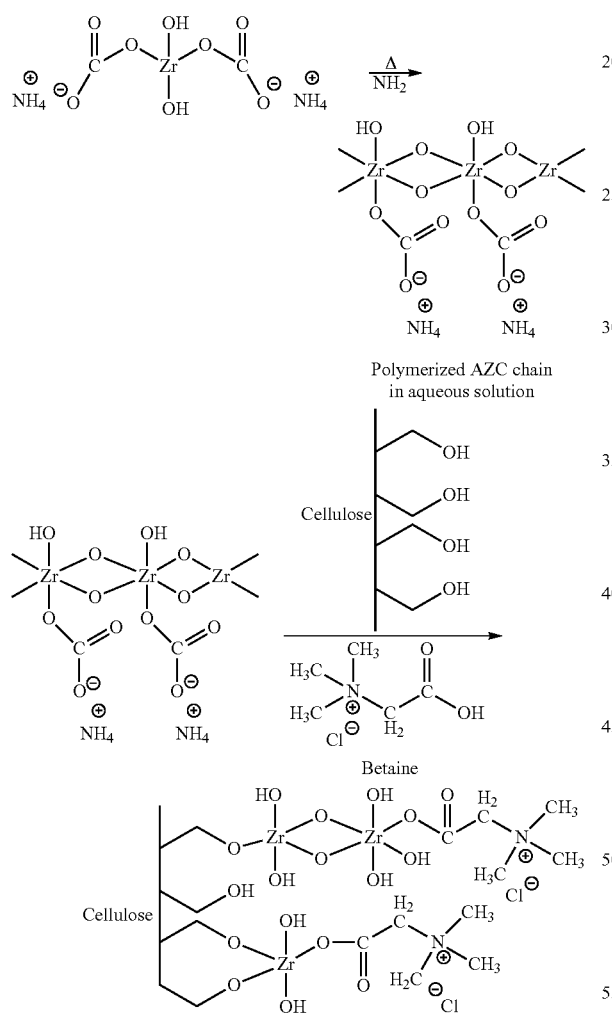

The resulting structure is a chemically modified surface, which consists of cellulose cross-linked by metal oxides, which is complexed to the carboxyl group of the betaine moiety.

AZC is an alkaline solution containing amine Zr species with bridging hydroxyl groups with carbonate bonding to the Zr. AZC has been approved by FDA for use as a component of paper and paperboard in contact with food. (Zr compounds are widely used as driers in paint industry as replacement for toxic lead systems).

Zr is known to form strong bonds with carboxyl groups and another possible structure of the final product upon the cross-linking of Zr salt with cellulose and betaine is hypothesized below.

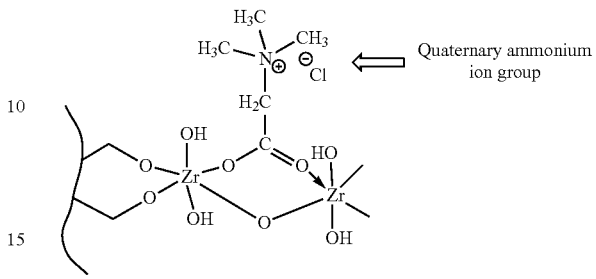

The substrate may contain hydroxyl groups on the surface or may also contain carboxyl groups. Examples of such substrate include carboxymethylcellulose and sodium alginate.

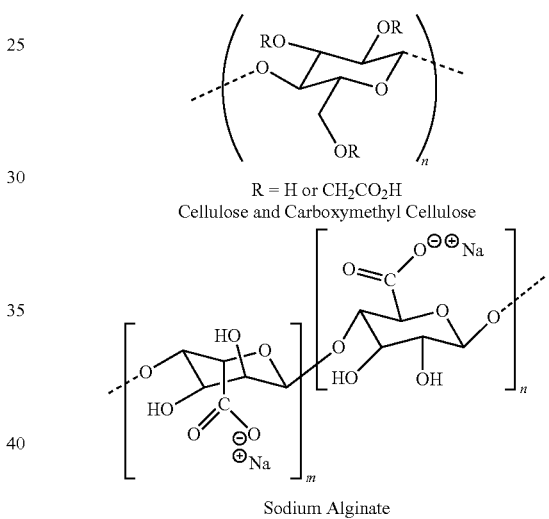

Since certain metal species, including Zr can form strong bonds with carboxylate groups, the composition could include a combination of the carboxyl-containing substrate, reactive metal salt (including Al, transitional metal, certain lanthanide metals) and betaine hydrochloride.

Betaine hydrochloride may be replaced with other carboxylic acids and include "basic" amino acids that have a positive charge in solution at pH 7. These include arginine, histidine and lysine. The pKa of the side chains are quite high and as a result remain protonated even at pH of 9. The alpha amino carboxyl structure of these amino acids has the structural feature that lends to effective chelation with transition metal ions.

Substrates of interest with hydroxyl groups on the surface would include, wood (such as that derived from Pine, Oak, Cedar etc.), cellulose sponge, peanut hulls, wood pulp, grass (such as elephant grass), bamboo, polyvinyl alcohol, soybean waste, Okara (soybean waste), cork, phenol-formaldehyde resins, corn cob (in pet beddings), old newspaper, coconut husk etc. Also graphene oxide which contain —OH groups on the surface) and mixtures thereof, may be used.

Substrates with amino groups on the surface could include commercially available amino resins including chitosan and resin A110 (supplied by Purolite) which is a polystyrene resin with primary amino groups on the surface. Of interest are also open celled foams which may have amino groups on the surface. Natural products such as used coffee grounds and proteins may also be used.

Substrates that contain carboxyl groups on the surface include Okara, peanut hulls, alginate and carboxymethylcellulose with both —OH and —COOH groups on the surface. Naturally occurring polymers with hydroxymethyl groups can be oxidized to carboxyl groups which could then be used as substrates with carboxyl groups on the surface. Substrates of these nature would have both hydroxyl as well as carboxyl groups on the surface.

The mechanism of removal of Phosphorus (which exists in the form of orthophosphate and organophohate) and other oxyanions (example, selenate, selenite, arsenate, arsenite, fluoride etc) in contaminated water, is believed to occur by an adsorption process. This is a chemical (adsorption) rather than a physical (absorption) process. There are two different mechanisms that can take place, independently and also synergistically during the adsorption process. The following is a hypothesis for the water purification mechanism. The quaternary ammonium group (from betaine or similar compounds) that is present on the surface of the composition can function as a strong anion exchanger. Anions that may be present in contaminated waters may include phosphates (including organophosphate), arsenates, selenates, molybdates, vanadates, ferrates, cuprates, manganates, chromates, zincates, etc. These may be classified as oxyanions which have an inherent charge on their surface. Because of the presence of (unmodified) carboxylates in some substrates the composition prepared by the method of the present invention may also remove metal ions such as $Fe^{3+}$, $Cu^{2+}$, $Ag^+$, $As^{3+}$, $As^{5+}$, etc that may be present in the aqueous solution.

The other mechanism by which the oxoanions are removed, may be due to chemisorption on the metal oxide nanoparticles present in the composition. The metal oxides are formed when metal salts are exposed to basic environment during synthesis of the composite. The transition metal oxides present in the composition may be nanostructures with a high surface area. Surface adsorption of the anions could take place through interaction of the anions with "d" orbitals present on the metal oxide species. This is a chemical phenomenon and could take place independently or synergistically in combination with the anion exchanging groups present on the surface of composition. The cationic groups on the surface of the composition would serve to attract the negatively charged oxyanions. The oxyanions could attach to the metal oxide nanoparticles because of their proximity to the cationic groups.

It is necessary that the (metal oxide) particles in the composition be nano-sized so that they will have a large surface area. Presence of bulk macro sized metal have a low surface area and contribute to a lower contaminant removal capacity. High surface area nano-metal oxides can be formed if the metal ions are separated prior to their "fixing" i.e. exposure to base (ammonium hydroxide, sodium carbonate or potassium hydroxide) during the preparation of the composite. The addition of betaine salt to the metal oxide precursor (i.e. the metal salt) ensures that the metal ions are separated prior to their fixing. The mechanism by which this happens may be the complexation of the metal ions with carboxyl group of the betaine prior to their fixing.

Because of the high coordination number of metal atoms being used, more than one betaine molecule can get coordinated to the metal atom.

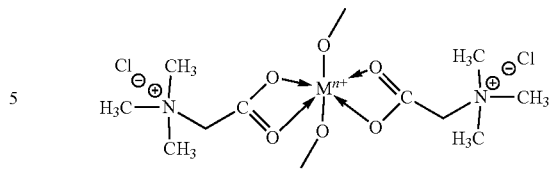

The schematic above shows interaction of the carboxyl group of betaine with metal ion, which could be Zr, Zn, Al, Ti or other metals that have been listed earlier.

Since the complexed species shown above are charged, they tend to repel each other ensuring that the metal ions are well separated prior to fixing. In some instances, the addition of alkali to the metal-complex would result in their conversion to oxides, while still retaining the betaine carboxylate in place because of chelation.

The present disclosure is also directed to the method of making the water purification compositions (as disclosed herein) containing a substrate with a surface containing hydroxyl, thiol, carboxyl and/or amino groups, a carboxylic acid compound, and a metal, wherein the metal cross-links the hydroxyl, thiol, carboxyl and/or amino groups on the surface of the substrate, and the carboxylic acid compound.

In one aspect, the method of making the water purification compositions of the present disclosure includes:
  providing a substrate having one or more functional groups that has hydroxyl, thiol, carboxyl, and/or amino group;
  depositing a solution of a metal salt on the substrate;
  depositing a solution of carboxylic acid compound on the substrate;
  forming a mixture wherein the metal cross-links the hydroxyl, thiol, carboxyl and/or amino groups on the surface of the substrate, and the carboxylic acid compound; and
  heating the mixture till the product is dry.

In another aspect, the method of making the water purification compositions of the present disclosure further includes:
  treating the mixture with an alkali so that the carboxylic acid compound becomes covalently attached to the metal.

In another aspect, the method of making the water purification compositions of the present disclosure further includes:
  heating the mixture so that the metal cross-links the hydroxyl, thiol, carboxyl and/or amino groups on the surface of the substrate.

In certain embodiments, the metal salt in the method of making the water purification compositions of the present disclosure contains an anion selected from a group of $Cl^-$, $NO_3^-$, $CH_3CO_2^-$, $SO_4^{2-}$, and combination thereof. In some specific embodiments, the metal salt in the method of making the water purification compositions of the present disclosure is ammonium zirconium carbonate, ammonium zinc carbonate, $Zr_2OCl_2 \cdot 8H_2O$, $ZrO(NO_3)_2$, or freshly prepared aqueous soluble $Zr(OH)_2$.

In another aspect, the method of making the water purification compositions of the present disclosure includes:
  providing a starting substrate having one or more functional groups capable of reacting with ammonium zirconium carbonate, ammonium zinc carbonate, or an activated zirconium species generated by thermal decomposition;

depositing a carboxylic acid compound solution on the surface of the substrate; treating the carboxylic acid compound deposited on the surface of the substrate with a solution of ammonium zirconium carbonate, ammonium zinc carbonate, or an activated zirconium species to form a mixture; and heating the mixture till the product is ammonia and carbon dioxide free.

In certain embodiments, the method of making the water purification compositions of the present disclosure includes heating the composite to a temperature, including but not limited to, up to 80° C., between 50° C. and 80° C., between 70 and 80° C. for a period of time effective to form a composite that is free of ammonia and carbon dioxide.

The composition of the present disclosure can be used to purify water contaminated with phosphate, selenite and heavy metal ions, and used in numerous fields, including but not limited to, oil and gas, mining, storm water, agricultural runoffs, municipal wastewater, and industrial wastewater.

Without intent to limit the scope of the invention, examples and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

EXAMPLES

The embodiments described above in addition to other embodiments can be further understood with reference to the following examples, which provide procedures for the synthesis and use of the composition in water purification for phosphate-contaminated waters Experiment No. 1

Composition Containing Zr and Betaine

To 5 grams of Eastern White Pine wood powder (~80 μm size) from American Wood Fibers, was sprayed a 15 mL solution containing 1.78 g of $ZrOCl_2.8H_2O$ and 1.536 g of betaine hydrochloride. The ingredients were well mixed and set aside for 30 minutes. This was then sprayed and mixed with 15 mL for conc. $NH_4OH$. The mixture was covered and set aside for 30 minutes. Then, it was heated uncovered in a convection oven at 80° C. for 7 hrs. The cooled product weighed 12.52 g. The product was washed in 800 mL DI water by suspending a coffee filter "tea bag" containing the product in a rapidly stirred solution for a period of 4 hrs. The wash water was decanted and the composition was washed again for 1 hr. The water was decanted and the wet composition was heated at 80° C. for 5 hrs and allowed to cool overnight. The dry product weighed 9.45 g.

Phosphorus removal experiment was performed with 300 mg of composition mechanically stirred in 100 mL of 10 mg P/L with aliquots taken at 15 min., 30 min., 1 hr., 2 hr., and 4 hr. The removal of the Phosphorus is shown in FIG. 1.

Experiment No. 2

To 10 grams of Eastern White Pine wood powder (~80 μm size) from American Wood Fibers, was sprayed a 30 mL solution containing 3.56 g of $ZrOCl_2.8H_2O$ and 3.072 g of betaine.HCl. The ingredients were well mixed and set aside for 2.5 minutes. This was then sprayed and mixed with 30 mL for conc. $NH_4OH$. The mixture was covered and set aside for 30'. Then it was heated uncovered in a convection oven at 80° C. for 7 hrs. The cooled product weighed 18.32 g. The product was washed in 800 mL (0.5 M) NaCl solution by suspending a coffee filter "tea bag" containing the product in a rapidly stirred solution for a period of 1 hrs. Decanted the wash water and wash the composition again in 800 mL DI water for 1 hr. The water was decanted and the wet composition was heated at 80° C. for 5 hrs and allowed to cool overnight. The dry product weighed 13.67 g.

Figure 2:
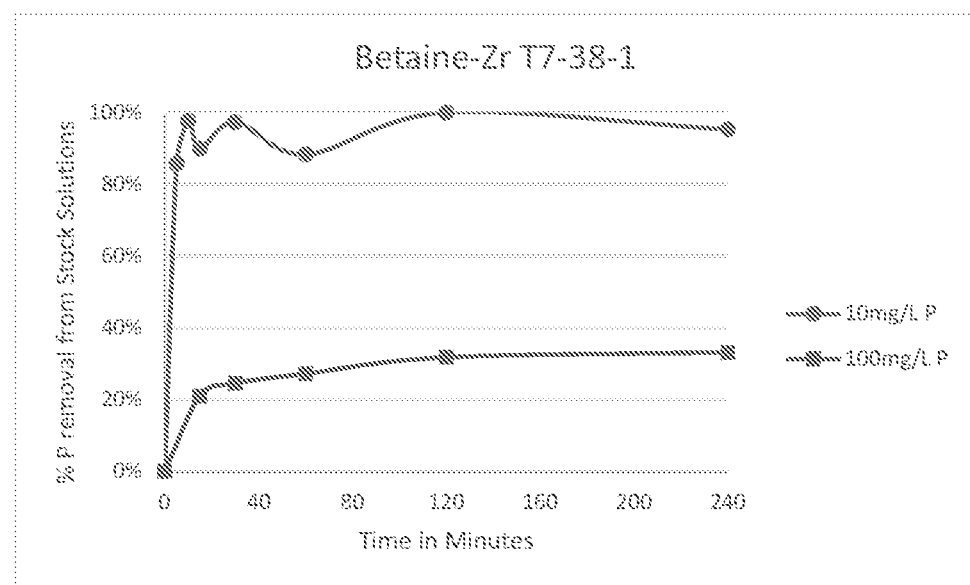
FIG. 2 illustrates the phosphorus removal experiment that was performed with 300 mg of the composition from Experiment No. 2, mechanically stirred in 100 mL of 10 mg P/L as well as 100 mL of 100 mg P/L with aliquots taken at 5 min., 10 min., 15 min., 30 min., 1 hr., 2 hr., and 4 hr, and by analyzing remaining phosphorus in water.

Phosphorus removal experiment was performed with 300 mg of composition mechanically stirred in 100 mL of 10 mg P/L as well as 100 mL of 100 mg P/L with aliquots taken at 5 min., 10 min., 15 min., 30 min., 1 hr., 2 hr., and 4 hr, and analyzed for remaining P in water. The removal of the Phosphorus is shown in FIG. 2.

Experiment No. 3

To 5 grams of Eastern White Pine wood powder (~80 μm size) from American Wood Fibers, was mixed with 4.62 g of zirconium solutions (Bacote™ from Mel Chemicals, ~20% Zirconium oxide) until uniform in appearance. Then 1.536 g of betaine hydrochloride was mixed with the above material until uniform in appearance. The ingredients were well mixed and set aside for 2.5 minutes. This was then sprayed and mixed with 30 mL for conc. $NH_4OH$. The mixture was covered and set aside for 30'. Then it was heated uncovered in a convection oven at 80° C. for 7 hrs. The cooled product weighed 7.13 g. The product was washed in 400 mL (0.5 M) NaCl solution by suspending a coffee filter "tea bag" containing the product in a rapidly stirred solution for a period of 1 hrs. Decanted the wash water and wash the composition again in 400 mL DI water for 1 hr. The water was decanted and the wet composition was heated at 80° C. for 5 hrs and allowed to cool overnight. The dry product weighed 6.95 g.

Figure 3:
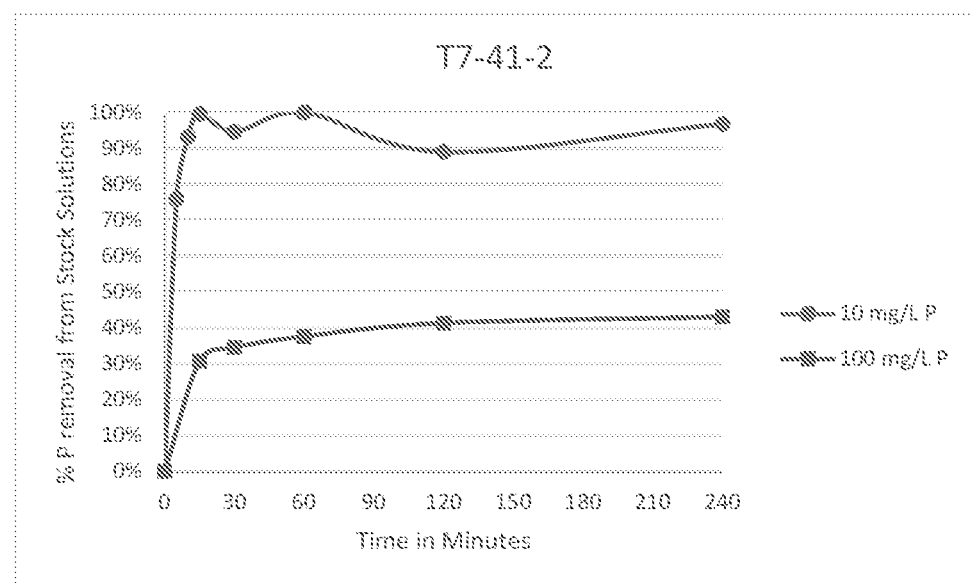
FIG. 3 illustrates the phosphorus removal experiment that was performed with 300 mg of the composition from Experiment No. 3, mechanically stirred in 100 mL of 10 mg P/L as well as 100 mL of 100 mg P/L with aliquots taken at 5 min., 10 min., 15 min., 30 min., 1 hr., 2 hr., and 4 hr, and by analyzing remaining phosphorus in water.

Phosphorus (P) removal experiment was performed with 300 mg of composition mechanically stirred in 100 mL of 10 mg P/L as well as 100 mL of 100 mg P/L with aliquots taken at 5 min., 10 min., 15 min., 30 min., 1 hr., 2 hr., and 4 hr, and analyzed for remaining P in water. The removal of the Phosphorus is shown in FIG. 3.

Experiment No. 4

Composition containing Zr, Al and betaine

To 5 grams of Eastern White Pine wood powder (~80 μm size) from American Wood Fibers, was mixed with 4.62 g of Bacote™ from Mel Chemicals until uniform in appearance. Then 1.536 g of betaine.HCl was mixed with 1.33 g of $AlCl_3.6H_2O$ in a mortar and pestle until uniform in appearance. The betaine.HCl-$AlCl_3.6H_2O$ mixture was mixed with the above material until uniform in appearance. This was then sprayed and mixed with 15 mL for conc. $NH_4OH$. The mixture was covered and set aside for 30 minutes. Then it was heated uncovered in a convection oven at 80° C. for 7 hrs. The cooled product weighed 8.57 g. The product was washed in 400 mL (0.5 M) NaCl solution by suspending a coffee filter "tea bag" containing the product in a rapidly stirred solution for a period of 1 hrs. Decanted the wash water and wash the composition again in 400 mL DI water for 1 hr. The water was decanted and the wet composition was heated at 80° C. for 5 hrs and allowed to cool overnight. The dry product weighed 6.85 g.

Figure 4:
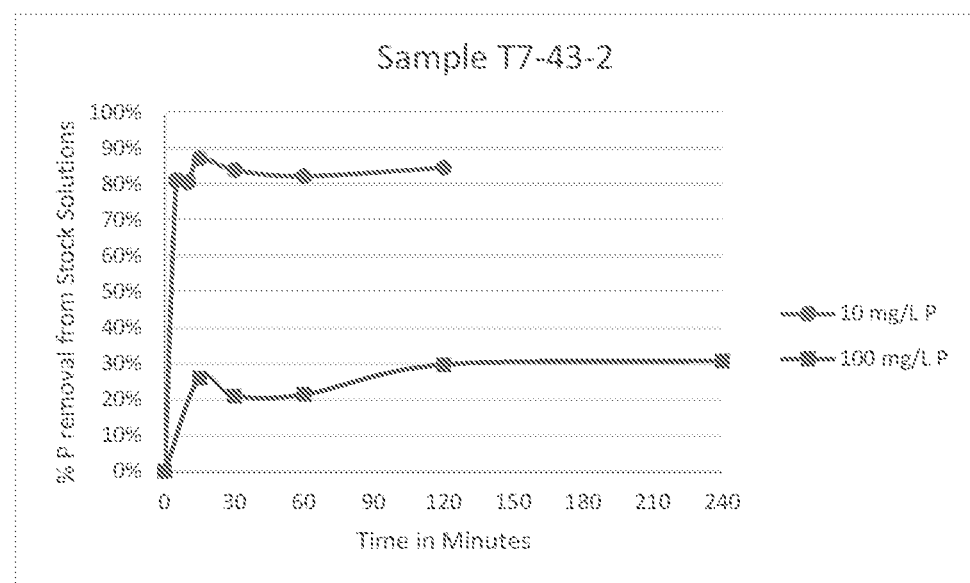
FIG. 4 illustrates the phosphorus removal experiment that was performed with 300 mg of the composition from Experiment No. 4, mechanically stirred in 100 mL of 10 mg P/L as well as 100 mL of 100 mg P/L with aliquots taken at 5 min., 10 min., 15 min., 30 min., 1 hr., 2 hr., and 4 hr, and by analyzing remaining phosphorus in water.

Phosphorus (P) removal experiment was performed with 300 mg of composition mechanically stirred in 100 mL of 10 mg P/L as well as 100 mL of 100 mg P/L with aliquots taken at 5 min., 10 min., 15 min., 30 min., 1 hr., 2 hr., and 4 hr, and analyzed for remaining P in water. The removal of the Phosphorus is shown in FIG. 4.

Experiment No. 5

Modified Method for Betaine Zr Composition

A 1.536 g sample of betaine hydrochloride was dissolved in 5 mL of deionized water. This was sprayed on 5 g of white pine powder and mixed thoroughly for 10 minutes. It was set aside for 1 hour. A 4.62 g sample of liquid Bacote™ was weighed and added to the sample above. Mixing was carried out with a glass rod for 10 minutes. Then, 15 mL of conc. ammonium hydroxide was added and mixed for 10 minutes. Kept the mixture covered and intermittently mixed for a period of 1 hour. The sample was placed in a covered ceramic petri dish at room temperature. This was then heated at 80° C. for a period of seven and half hours, and left in the oven, overnight at room temperature. The dry product weighed 7.07 g.

Figure 5:
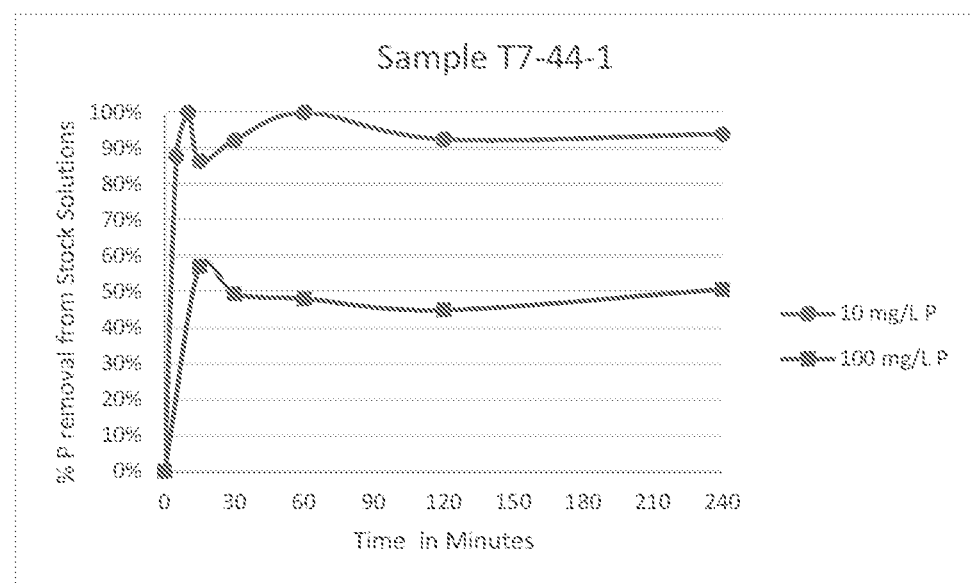
FIG. 5 illustrates the phosphorus removal experiment that was performed with 300 mg of the composition from Experiment No. 5, mechanically stirred in 100 mL of 10 mg P/L as well as 100 mL of 100 mg P/L with aliquots taken at 5 min., 10 min., 15 min., 30 min., 1 hr., 2 hr., and 4 hr, and by analyzing remaining phosphorus in water.

Phosphorus (P) removal experiment was performed with 300 mg of composition mechanically stirred in 100 mL of 10 mg P/L as well as 100 mL of 100 mg P/L with aliquots taken at 5 min., 10 min., 15 min., 30 min., 1 hr., 2 hr., and 4 hr, and analyzed for remaining P in water. The removal of the Phosphorus is shown in FIG. 5.

Experiment No. 6

Modified Method for Betaine Zr Composition

A 0.768 g sample of betaine hydrochloride was dissolved in 5 mL of deionized water. This was sprayed on 5 g of white pine powder and mixed thoroughly for 10 minutes. It was set aside for 1 hour. A 3.08 g sample of liquid Bacote 20 was weighed and added to the sample above. Mixing was carried out with a glass rod for 10 minutes. Kept the mixture covered and intermittently mixed for a period of 1 hour. The sample was placed in a covered ceramic petri dish at room temperature. This was then heated at 80 degrees C. for a period of seven and half hours, and left in the oven, overnight at room temperature. The dry product weighed 6.62 g.

Figure 6:
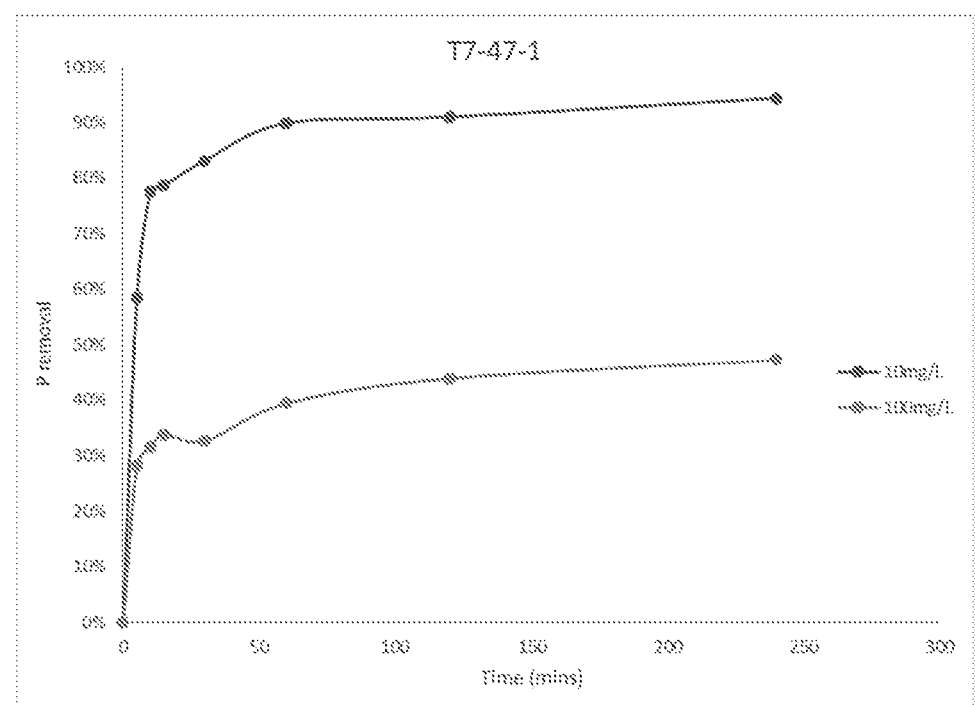
FIG. 6 illustrates the phosphorus removal experiment that was performed with 300 mg of the composition from Experiment No. 6, mechanically stirred in 100 mL of 10 mg P/L with aliquots taken at 15 min., 30 min., 1 hr., 2 hr., and 4 hr, and by analyzing remaining phosphorus in water.

Phosphorus (P) removal experiment was performed with 300 mg of composition mechanically stirred in 100 mL of 10 mg P/L as well as 100 mL of 100 mg P/L with aliquots taken at 5 min., 10 min., 15 min., 30 min., 1 hr., 2 hr., and 4 hr, and analyzed for remaining P in water. The removal of the Phosphorus is shown in FIG. 6.

Experiment No. 7

Modified method for betaine Zr composition

A 1.536 g sample of betaine hydrochloride was dissolved in 5 mL of deionized water. This was sprayed on 5 g of white pine powder and mixed thoroughly for 10 minutes. It was set aside for 1 hour. A 3.08 g sample of liquid Bacote 20 was weighed and added to the sample above. Mixing was carried out with a glass rod for 10 minutes. Kept the mixture covered and intermittently mixed for a period of 1 hour. The sample was placed in a covered ceramic petri dish at room temperature. This was then heated at 80 degrees C. for a period of seven and half hours, and left in the oven, overnight at room temperature. The dry product weighed 7.44 g.

Figure 7:
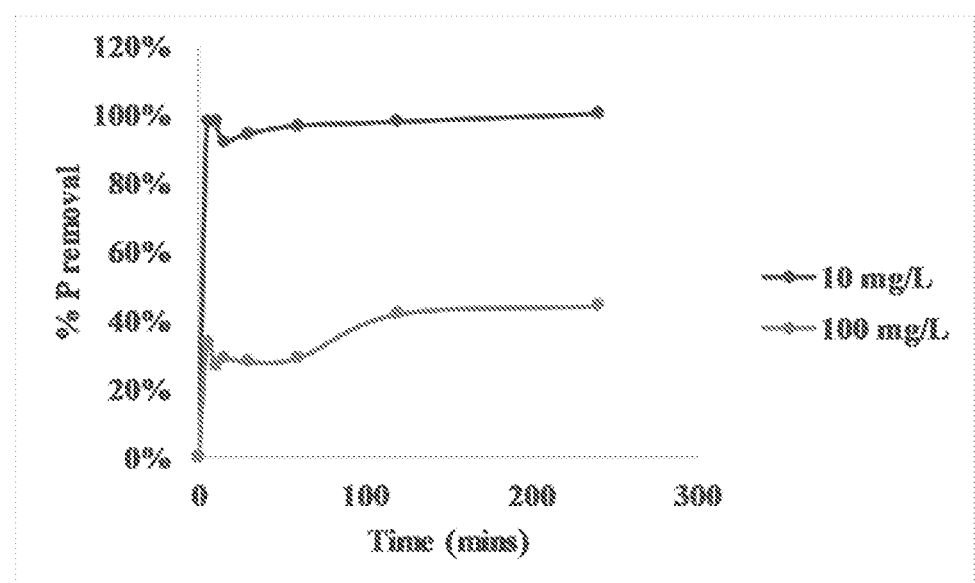
FIG. 7 illustrates the phosphorus removal experiment that was performed with 300 mg of the composition from Experiment No. 7, mechanically stirred in 100 mL of 10 mg P/L as well as 100 mL of 100 mg P/L with aliquots taken at 5 min., 10 min., 15 min., 30 min., 1 hr., 2 hr., and 4 hr, and by analyzing remaining phosphorus in water.

Phosphorus (P) removal experiment was performed with 300 mg of composition mechanically stirred in 100 mL of 10 mg P/L as well as 100 mL of 100 mg P/L with aliquots taken at 5 min., 10 min., 15 min., 30 min., 1 hr., 2 hr., and 4 hr, and analyzed for remaining P in water. The removal of the Phosphorus is shown in FIG. 7.

Experiment No. 8

Arginine-Zinc Composition

The following method and result demonstrates that a different metal and a different acid may be used for the preparation of composition for water purification:

A 2.369 g (0.01125 moles) sample of arginine hydrochloride was dissolved in 5 mL of deionized water. This was sprayed on 5 g of white pine powder and mixed thoroughly for 10 minutes. It was set aside for 1 hour. A 1.022 g (0.0075 moles) sample of zinc chloride dissolved in 5 mL DI water was added to the sample above. Mixing was carried out with a glass rod for 10 minutes, and then intermittently mixed for a period of 1 hour. Then 15 mL of conc. ammonium hydroxide was added and mixed for 60 minutes. The sample was placed in a covered ceramic petri dish at room temperature when not being mixed. This was then heated (uncovered) at 80 degrees C. for a period of seven and half hours, and left in the oven, overnight at room temperature. The dry product weighed 8.44 g.

Figure 8:
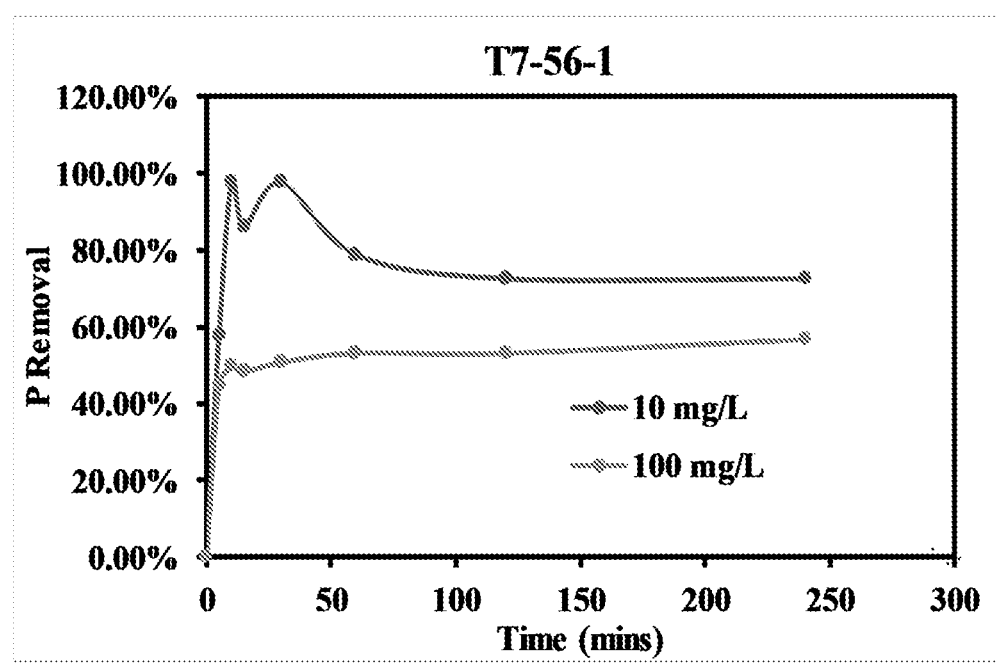
FIG. 8 illustrates the phosphorus removal experiment that was performed with 300 mg of the composition from Experiment No. 8, mechanically stirred in 100 mL of 10 mg P/L as well as 100 mL of 100 mg P/L with aliquots taken at 5 min., 10 min., 15 min., 30 min., 1 hr., 2 hr., and 4 hr, and by analyzing remaining phosphorus in water.

Phosphorus (P) removal experiment was performed with 300 mg of composition mechanically stirred in 100 mL of 10 mg P/L as well as 100 mL of 100 mg P/L with aliquots taken at 5 min., 10 min., 15 min., 30 min., 1 hr., 2 hr., and 4 hr, and analyzed for remaining P in water. The removal of the Phosphorus is shown in FIG. 8.

Experiment No. 9

Zinc-Zirconium-Betaine Composition

The following method and result demonstrates that a mix of metals and an acid may be used for the preparation of composition for water purification:

A 1.5368 (0.01 mole) sample of betaine hydrochloride was dissolved in 5 mL of deionized water. This was mixed thoroughly with 5.05 g of white pine powder and set aside for 1 hour. A 0.6462 g (0.00375 moles) sample of zinc chloride dihydrate was dissolved in 5 mL DI water and added to the sample above. Mixing was carried out with a glass rod for 10 minutes, and then intermittently mixed for a period of 45 minutes. Then 2.3144 g (0.00375 moles of Zr) of Bacote 20 was added and set aside for 45 minutes. Then 15 mL of conc. ammonium hydroxide was added and mixed for 60 minutes. The mixture was then heated (uncovered) at 80 degrees C. for a period of seven and half hours, in the oven, and left overnight at room temperature. The dry product weighed 7.82 g.

Figure 9:
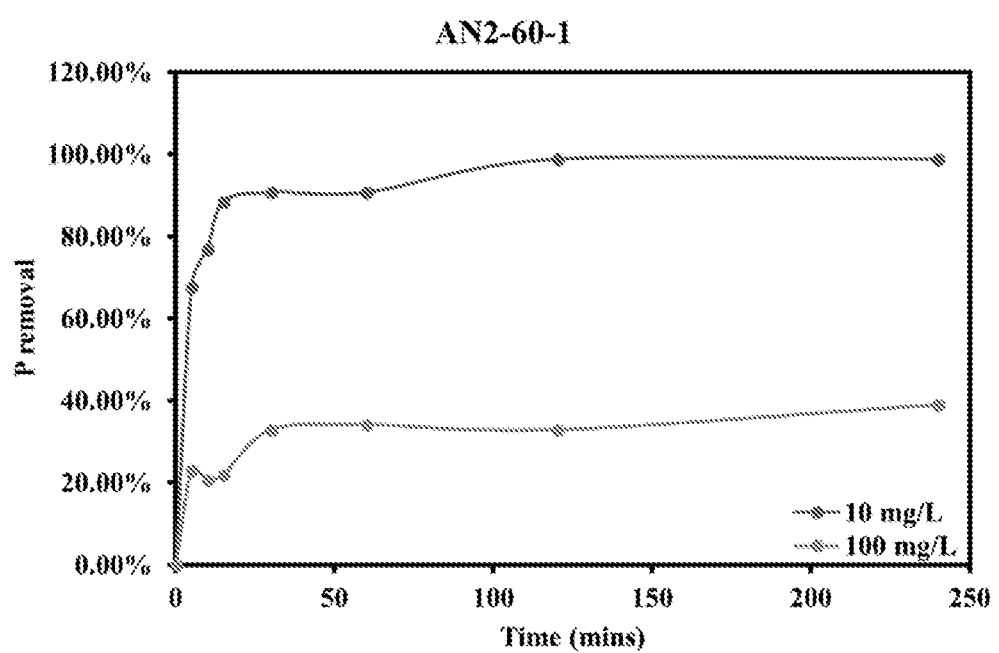
FIG. 9 illustrates the phosphorus removal experiment that was performed with 300 mg of the composition from Experiment No. 9, mechanically stirred in 100 mL of 10 mg P/L as well as 100 mL of 100 mg P/L with aliquots taken at 5 min., 10 min., 15 min., 30 min., 1 hr., 2 hr., and 4 hr, and by analyzing remaining phosphorus in water.

Phosphorus (P) removal experiment was performed with 300 mg of composition mechanically stirred in 100 mL of 10 mg P/L as well as 100 mL of 100 mg P/L with aliquots taken at 5 min., 10 min., 15 min., 30 min., 1 hr., 2 hr., and 4 hr, and analyzed for remaining P in water. The removal of the Phosphorus is shown in FIG. 9.

Experiment No. 10

Betaine Zn Composition

The following method and result demonstrates that ammonium zinc carbonate and an acid may be used for the preparation of composition for water purification:

A 1.536 g sample of betaine hydrochloride was dissolved in 5 mL of conc. ammonium hydroxide. This was mixed thoroughly with 5 g of white pine powder for 10 minutes. It was set aside for 20 additional minutes. A 4.069 g sample of liquid ammonium zinc carbonate solution (Charkit) containing 15% zinc oxide was weighed and added to the sample above. Mixing was carried out with a glass rod for 10 minutes and set aside for 20 minutes. The sample was placed in a covered ceramic petri dish at room temperature. This was then heated at 80 degrees C. for a period of seven and half hours, and left in the oven, overnight at room temperature. The dry product weighed 6.93 g.

Figure 10:
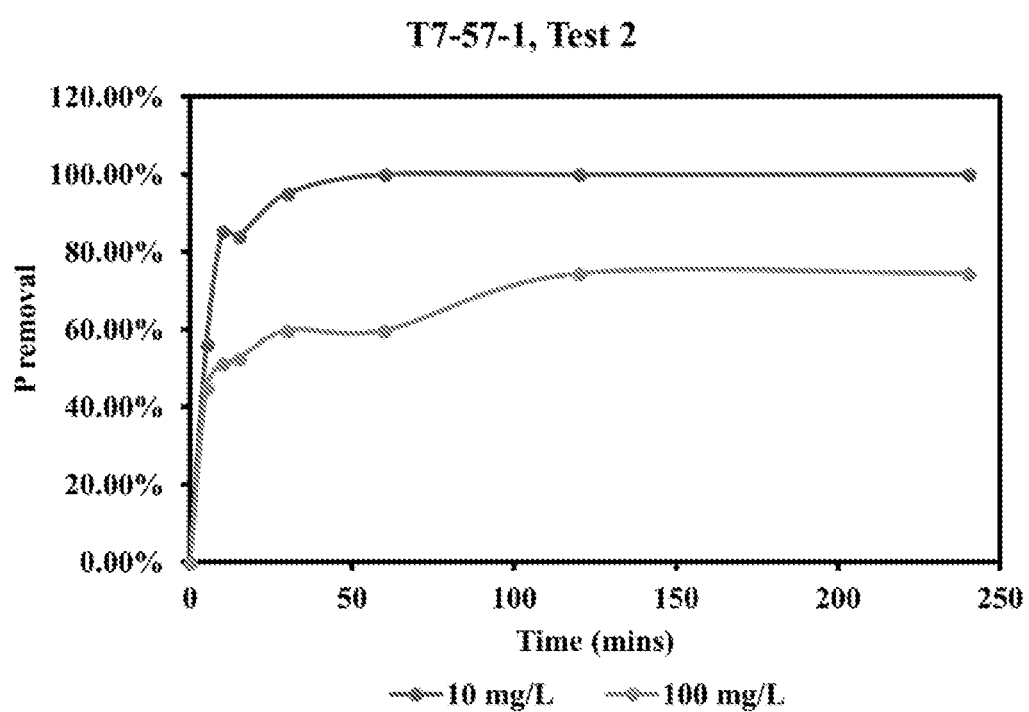
FIG. 10 illustrates the phosphorus removal experiment that was performed with 300 mg of the composition from Experiment No. 10, mechanically stirred in 100 mL of 10 mg P/L as well as 100 mL of 100 mg P/L with aliquots taken at 5 min., 10 min., 15 min., 30 min., 1 hr., 2 hr., and 4 hr, and by analyzing remaining phosphorus in water.

Phosphorus (P) removal experiment was performed with 300 mg of composition mechanically stirred in 100 mL of 10 mg P/L as well as 100 mL of 100 mg P/L with aliquots taken at 5 min., 10 min., 15 min., 30 min., 1 hr., 2 hr., and 4 hr, and analyzed for remaining P in water. The removal of the Phosphorus is shown in FIG. 10.

Experiment No. 11

Figure 11:
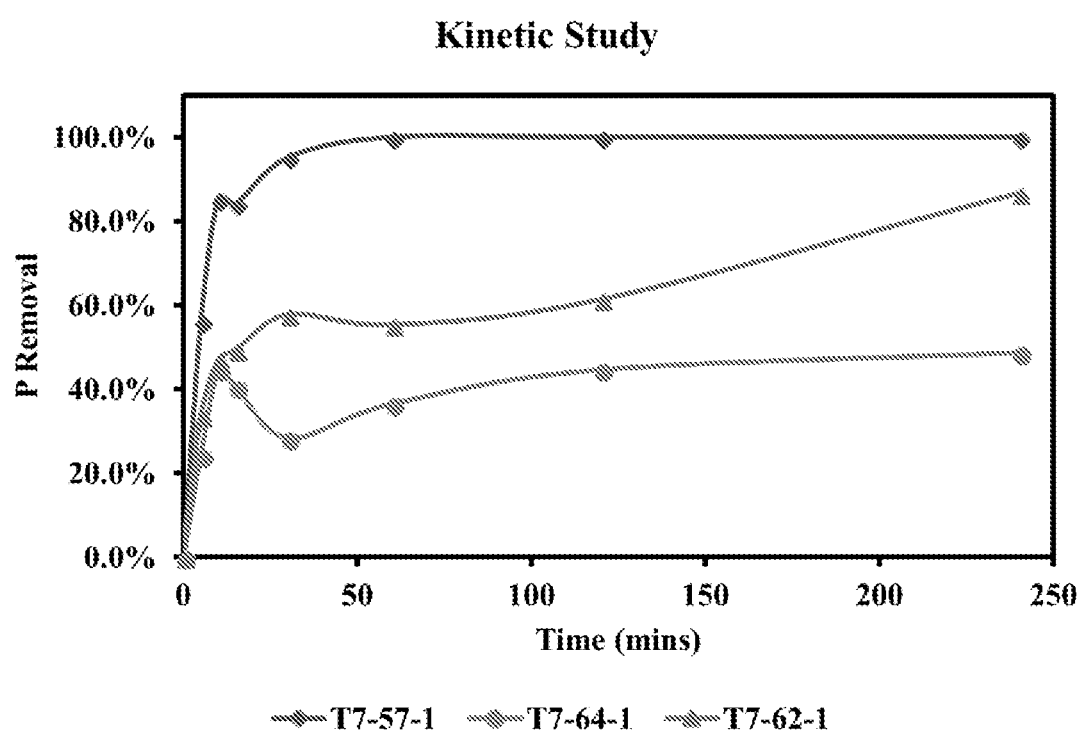
FIG. 11 illustrates a comparison of the performance among (1) Zn-betaine composition (top), (2) Zinc composition without betaine (middle), and (3) betaine composition without Zinc (bottom).

Performance of Zn-betaine composition and comparison of performance with betaine and Zinc control As illustrated in FIG. 11, T7-57-1 (top) is the performance of Zn-betaine composition. The middle curve is Zinc (alone) composition without the addition of betaine and the bottom curve is for betaine (alone) without the addition of Zinc. It is clear that the effects of both zinc and betaine are synergistic in the composition of the present disclosure.

EQUIVALENTS

Those skilled in the art will recognize, or be able to ascertain using no more than routine experimentation, many equivalents to the specific embodiments and methods described herein. Such equivalents are intended to be encompassed by the scope of the following claims.

It is understood that the detailed examples and embodiments described herein are given by way of example for illustrative purposes only, and are in no way considered to be limiting to the disclosure. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present disclosure will be apparent from the appended claims. Moreover, those skilled in the art will recognize, or be able to ascertain using no more than routine experimentation, many equivalents to the specific embodiments of the disclosure described herein. Such equivalents are intended to be encompassed by the following claims.

What is claimed is:

1. A method of producing a water purification composition, comprising:
    providing a substrate having one or more functional groups that has hydroxyl, thiol, carboxyl, and/or amino group;
    depositing a solution of a metal salt on the substrate;
    depositing a solution of carboxylic acid compound on the substrate;
    forming a mixture wherein the metal cross-links the hydroxyl, thiol, carboxyl and/or amino groups on the surface of the substrate, and the carboxylic acid compound; and
    heating the mixture until the product is dry,
    wherein the carboxylic acid compound contains a positively charged group.

2. The method of claim 1, further comprising:
    heating the mixture so that the metal cross-links the hydroxyl, thiol, carboxyl and/or amino groups on the surface of the substrate.

3. The method of claim 1, wherein the substrate is selected from a group consisting of wood, cellulose, alginate, carboxymethylcellulose, hydroxypropyl cellulose, chitin, lignin, tannin, silk, wool, chitosan, peanut hulls, wood pulp, grass, bamboo, polyvinyl alcohol, soybean waste, okara, cork, phenol-formaldehyde resins, corn cob, old newspaper, coconut husk, graphene oxide, activated carbon, amino resin, open celled foams containing hydroxyl, amino or carboxyl groups on its surface, coffee grounds, protein, and combination thereof.

4. The method of claim 1, wherein the metal salt contains a cation selected from a group consisting of Al, Ti, Mn, Fe, Co, Ni, Cu, Zn, Zr, Mo, Sn, Bi, La, Ce, Y, and combination thereof.

5. The method of claim 1, wherein the metal in the composition is in a reduced oxidation state compared with the metal in the metal salt.

6. The method of claim 1, wherein the metal salt contains an anion selected from a group consisting of Cl$^-$, NO$_3^-$, CH$_3$CO$_2^-$, SO$_4^{2-}$, and combination thereof.

7. The method of claim 1, wherein the metal salt is ammonium zirconium carbonate, ammonium zinc carbonate, Zr$_2$OCl$_2$·8H$_2$O, ZrO(NO$_3$)$_2$, or freshly prepared aqueous soluble Zr(OH)$_2$.

8. The method of claim 1, wherein the produced water purification composition comprises the substrate with a surface containing hydroxyl, thiol, carboxyl and/or amino groups, a carboxylic acid compound, and a metal, wherein the metal cross-links the hydroxyl, thiol, carboxyl and/or amino groups on the surface of the substrate, and the carboxylic acid compound.

9. A method of producing a water purification composition, comprising:
    providing a substrate having one or more functional groups that has hydroxyl, thiol, carboxyl, and/or amino group;
    depositing a solution of a metal salt on the substrate;
    depositing a solution of carboxylic acid compound on the substrate;
    forming a mixture wherein the metal cross-links the hydroxyl, thiol, carboxyl and/or amino groups on the surface of the substrate, and the carboxylic acid compound;
    heating the mixture until the product is dry; and
    treating the mixture with an alkali so that the carboxylic acid compound becomes covalently attached to the metal.

10. A method of producing a water purification composition,
    providing a substrate having one or more functional groups that has hydroxyl, thiol, carboxyl, and/or amino group;
    depositing a solution of a metal salt on the substrate;
    depositing a solution of carboxylic acid compound on the substrate;
    forming a mixture wherein the metal cross-links the hydroxyl, thiol, carboxyl and/or amino groups on the surface of the substrate, and the carboxylic acid compound; and
    heating the mixture until the product is dry; and
    wherein the carboxylic acid compound is selected from a group consisting of betaine or a betaine derivative, aromatic carboxylic acid, arginine, lysine, histidine, and combination thereof; and
    wherein the carboxylic acid compound is selected from a group consisting of

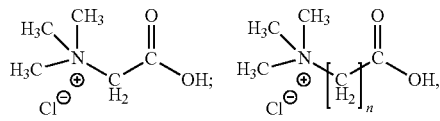

wherein n is 1 through 8;
isoleucine betaine hydrochloride salt; and

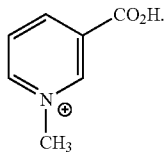

11. A method of producing a water purification composition, comprising:
   providing a starting substrate having one or more functional groups capable of reacting with ammonium zirconium carbonate, ammonium zinc carbonate, or an activated zirconium species generated by thermal decomposition;
   depositing a carboxylic acid compound solution on the surface of the substrate;
   treating the carboxylic acid compound deposited on the surface of the substrate with a solution of ammonium zirconium carbonate, ammonium zinc carbonate, or an activated zirconium species to form a mixture; and
   heating the mixture till the product is ammonia and carbon dioxide free.

12. The method of claim 11, further comprising:
   treating the mixture with an alkali so that the carboxylic acid compound becomes covalently attached to the zirconium.

13. The method of claim 11, wherein the mixture is heated to a temperature up to 80° C.

14. The method of claim 11, wherein the mixture is heated between 70 and 80° C. for a period of time effective to form a composite that is free of ammonia and carbon dioxide.

15. The method of claim 11, wherein the produced water purification composition comprises the substrate with a surface containing hydroxyl, thiol, carboxyl and/or amino groups, a carboxylic acid compound, and a metal, wherein the metal cross-links the hydroxyl, thiol, carboxyl and/or amino groups on the surface of the substrate, and the carboxylic acid compound.

* * * * *